United States Patent
Oh

[19]

[11] Patent Number: 5,947,399
[45] Date of Patent: Sep. 7, 1999

[54] BAIT CASTING REEL SWITCHABLE FOR USE BY A LEFT-HANDED OR RIGHT-HANDED PERSON

[75] Inventor: Cheol Suk Oh, Seoul, Rep. of Korea

[73] Assignee: Shin A Sports Co., Ltd., Incheon, Rep. of Korea

[21] Appl. No.: 09/115,348

[22] Filed: Jul. 14, 1998

[30] Foreign Application Priority Data

Jul. 15, 1997 [KR] Rep. of Korea ...................... 97-32721

[51] Int. Cl.[6] ............................................... A01K 89/033
[52] U.S. Cl. .......................................... 242/296; 242/282
[58] Field of Search ................................... 242/282, 306, 242/296

[56] References Cited

U.S. PATENT DOCUMENTS

| | | | |
|---|---|---|---|
| 3,499,613 | 3/1970 | Sarah | 242/282 |
| 3,635,418 | 1/1972 | Kamei | 242/282 |
| 3,827,649 | 8/1974 | Payen | 242/296 |
| 4,832,278 | 5/1989 | Sugeta | 242/282 |
| 4,962,900 | 10/1990 | Dorbandt | 242/282 |
| 4,966,336 | 10/1990 | Humble et al. | 242/295 |
| 5,609,309 | 3/1997 | Oh | 242/282 |
| 5,752,667 | 5/1998 | Merill et al. | 242/296 |

*Primary Examiner*—Donald P. Walsh
*Assistant Examiner*—Minh-Chau Pham
*Attorney, Agent, or Firm*—Peter F. Corless; Dike, Bronstein, Roberts & Cushman, LLP

[57] ABSTRACT

A bait casting reel enables a user to easily control rotation of the spool. The bait casting reel includes a frame, a spool rotatably supported by the frame, a lever externally disposed and movable by a user to a left-handed position and a right-handed position, and a click member coupled to and movable by the lever, the click member allowing rotation of the spool in a first direction and preventing rotation in a second direction when the lever is moved to the left-handed position. The click member allows rotation of the spool in the second direction and prevents rotation in the first direction when the lever is moved to the right-handed position. A click holder is provided inside of the cover of the bait casting reel. The click holder comprises a head contactably coupled with the gears of the spool, a tail contacting with bosses formed inside of the cover, and a click having a shoulder abutted on protrusions provided inside of the cover. The spool is rotatable in clockwise and/or counter-clockwise directions through simple manipulation of a stopper lever.

4 Claims, 3 Drawing Sheets

BAIT CASTING REEL SWITCHABLE FOR USE BY A LEFT-HANDED OR RIGHT-HANDED PERSON

BACKGROUND OF THE INVENTION

1. Field of the Invention

The present invention relates to a bait casting reel, and more particularly to a bait casting reel, in which the user can easily control rotating direction of the spool.

2. Description of the Prior Art

The conventional bait casting reel includes a handle, a driving gear interlocked by rotation of the handle, and a spool driven by the driving gear.

In such a conventional bait casting reel, the spool can freely rotate (in the unwinding direction) when casting the fishing line and (in the winding direction) when winding the fishing line. If a fish is caught by the fishing rod, however, the spool should not rotate in the unwinding direction. To prevent this occasion, a device is provided with the main body of the reel for preventing reverse rotation of the spool.

The device for preventing reverse rotation of the spool necessitates an alternation of the rotating direction of the driving gear depending on whether the user is a dextral or a southpaw. Usually, the device for preventing the reverse rotation comprises switching means for alternating the rotating directions for the dextrals or the southpaws positioned on the cover opposite to that on which the handle is provided. The switching means is provided generally in the form of screws, and is covered by a drag knob from outside. If desired, the user may dissemble the drag knob, and alternatively assemble the screws depending on his or her preferred hand for use of the reel.

As described above, the switching means is provided inside of the drag knob. Thus, it is required to alter the position of the switching means depending on the user's hand-using habit. If necessary, the user should alter the position of the switching means by opening the drag knob. Such process necessitating disassemblage and assemblage of the drag knob is very complicated.

SUMMARY OF THE INVENTION

To solve the above problems, an object of the present invention is to provide a bait casting reel which can be easily switched for user's convenience depending on whether he or she is a dextral or a southpaw.

Another object of the present invention is to provide a bait casting reel in which rotating direction of the spool can be easily controlled.

In order to achieve the above objects, there is provided bait casting reel comprising a frame, a spool rotatably supported by the frame, a lever externally disposed and movable by a user to a left-handed position and a right-handed position, and a click member coupled to and movable by the lever, the click member allowing rotation of the spool in a first direction and preventing rotation in a second direction when the lever is moved to the left-handed position, the click member allowing rotation of the spool in the second direction and preventing rotation in the first direction when the lever is moved to the right-handed position.

BRIEF DESCRIPTION OF THE DRAWINGS

The above objects and advantages of the present invention will become more apparent by the following explanation accompanying the drawings, in which.

DETAILED DESCRIPTION OF THE PREFERRED EMBODIMENT

To achieve the above objects and advantages, there is provided a first invention according to the present invention, comprising: a frame; a spool having gears on both side faces and rotatably supported inside of the frame; a cover having a handle positioned on one external side thereof, a click holder positioned on the other internal side thereof, and a stopper lever positioned outside for moving the click holder.

The click holder preferably comprises a click on an upper portion, and gear teeth on a lower portion. The click comprises a head contactably coupled with the gear of the spool; and a tail contacting with bosses formed inside of the cover; and a shoulder abutted on the protrusions provided inside of the cover.

The click is elastically supported by a pair of springs. Accordingly, click sound is generated due to contact of the click with the gear of the spool when the spool rotates. It is preferable for the click to be coupled with a stopper lever by a screw.

The click holder is movable along a guide channel formed on the cover but is abutted on the end portions of the screws and the guide channel. The click holder may be variably operated depending on the interactions between the bosses and protrusions formed inside of the click and the cover. If the tail of the click contacts with the bosses of the cover, no click sound is generated between the gear of the spool and the head. If the shoulder of the click is abutted on the protrusions of the cover, the spool can rotate in any one direction.

There is provided a second invention according to the present invention, comprising: a frame; a spool rotatably supported inside of the frame and has gears on both side faces; a cover having a handle positioned on one external side thereof, a click holder positioned on the other internal side thereof, and a stopper lever positioned outside for moving the click holder; a head contactably coupled with the gears of the spool inside of the click holder; a tail contacting with the bosses formed inside of the cover; and a click having a shoulder abutted on the protrusions provided inside of the cover. The spool is rotatable in both directions or in any one direction according to the rotation of the stopper lever.

A preferred embodiment of the present invention will now be explained with reference to the drawings.

Figure 1:
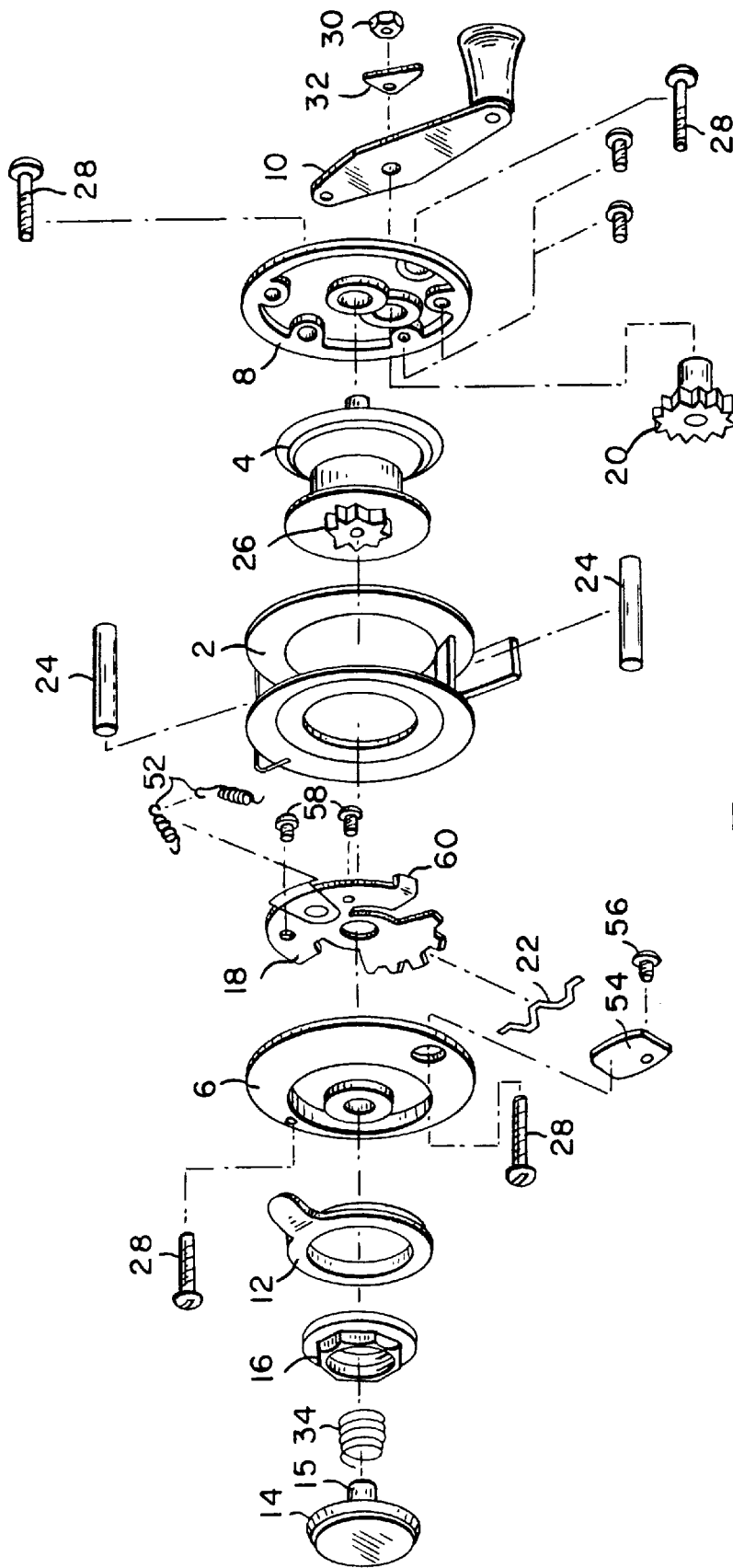
FIG. 1 is a sectional perspective view of the bait casting reel according to a preferred embodiment of the present invention.

FIG. 1 is a sectional perspective view illustrating a bait casting reel according to a preferred embodiment of the present invention.

Referring to FIG. 1, the bait casting reel comprises: a frame 2 composed of heat plastic resin; a spool 4 inserted in the middle of the frame 2; left and right covers 6, 8 for shielding the left and right sides of the frame 2; a handle 10 coupled with a helical driving gear 20 and the right cover 8; and a drag knob 14 coupled with the left cover 6.

The frame 2 comprises two fixing pins 24 for fixing the left and right covers 6, 8. The fixing pins 24 are hollow cylinders, inside of which helices are formed to be coupled with the screw 28 through the open outlets of the covers 6, 8.

The spool 4 comprises a helical gear (not illustrated) orienting the driving gear so that the rotating force generated by rotation of the handle 10 can be transmitted to the spool 4 via the helical driving gear 20. Spur gear 26 is positioned opposite to the spool 4 so as to generate click sound when abutted on the head 68 of the click 50 (FIG. 2), which is coupled with the click holder 18, when rotating.

As shown in FIGS. 1 to 4, the click holder 18 is coupled with the stopper lever 12 by the screw 58 while the left cover 6 is included. A pinion 15 of the drag knob 14 fixes the click plate 16, the left cover 6 and the click holder 18 while the spring 34 is biased.

The handle 10 provided with the right cover 8 comprises a line clip 32 at the rotating center, and a nut 30 coupled with the shaft of the driving gear 20.

The major characteristics of the bait casting reel according to the preferred embodiment of the present invention is that the user can easily control the rotating direction of the spool. To be specific, the stopper lever 12 of the reel according to the present invention may be positioned at various positions for use by the ambidexters, the dextrals, and the southpaws. In one embodiment, the lever has the following positions in order: R (right-handed or dextral), off (neutral), click (ambidexters), off (neutral), and L (left-handed or southpaw).

If the stopper lever 12 is positioned at the ambidexters' position, the spool 4 can be rotated by the handle 10 in clockwise and counter-clockwise directions with click sound. If the stopper lever 12 is positioned at the southpaws' or the dextrals' position, the spool 4 can be rotated either in clockwise or counter-clockwise direction, and also generating click sound. If the stopper lever 12 is disposed at the neutral position, the spool 4 can be rotated in both directions without generating the click sound.

Figure 2:
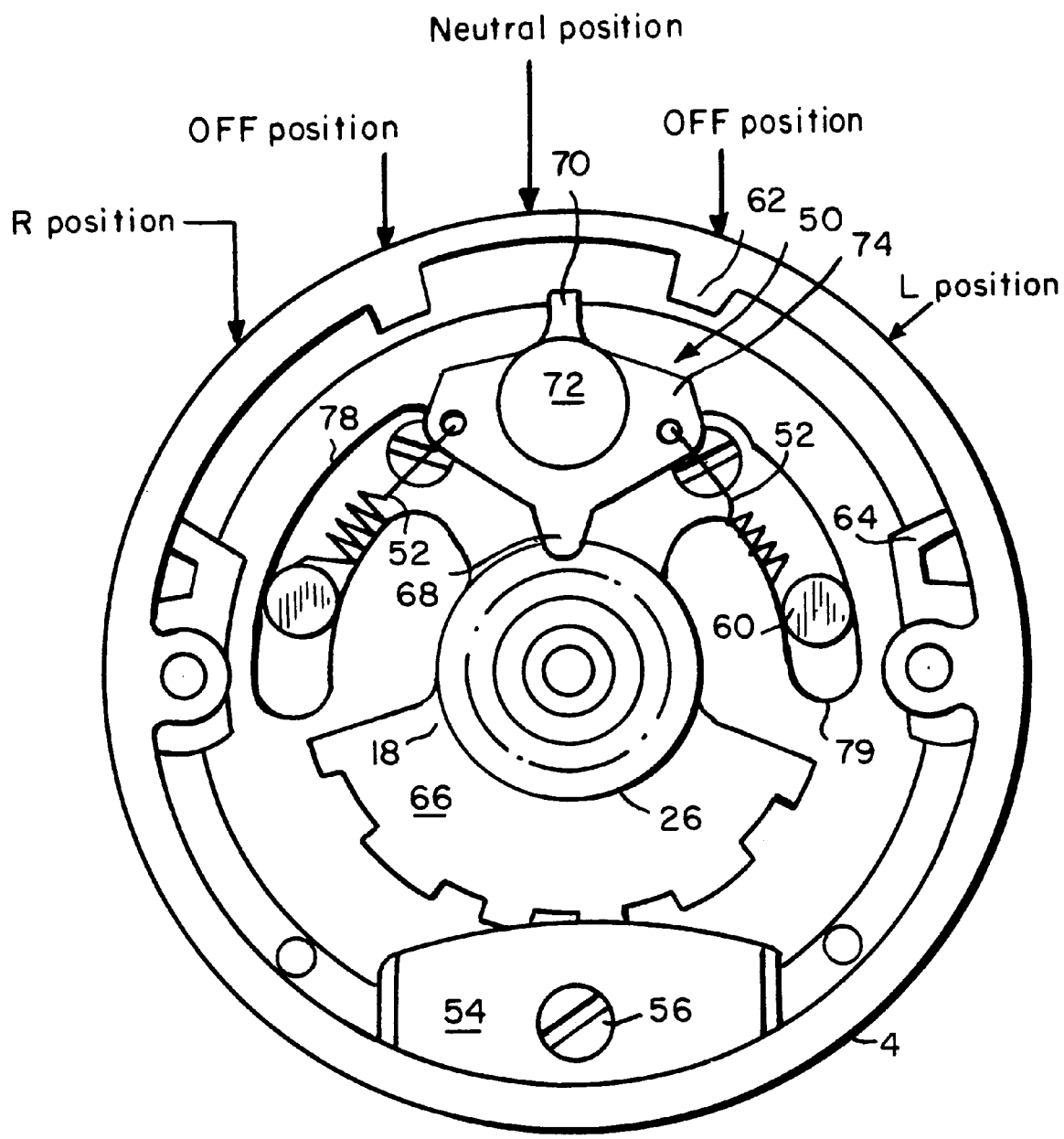
FIG. 2 is a side elevational view illustrating status of a click holder positioned across the handle.

The major characteristics of the present invention described above will be explained in detail with reference to FIGS. 2 to 4.

The click holder 18 is disposed on the left cover 6; a click 50 is rotatably fixed to the click holder 18 by the fixing stud 72; spring fixing sections 60 are formed on both side faces, and gear teeth 66 shaped like a fan is disposed on a lower portion of the click holder. The gear teeth 66 are elastically contacted with the clip spring 22 fixed inside of the cover 6. The plate 54 fixed by the screw 56 prevents the clip spring 22 from being seceded forward.

The click 50 comprises a head 68 contacting with the spur gear 26 of the spool 4, a tail 70 positioned opposite to the head 68 and contacts with the bosses 62 by the movement of the stopper lever 12, and a shoulder 74 abuts the tail 70 and the protrusions 64 for blocking the click 50 from being rotated. The click 50 is elastically supported by the springs 52, 52, one end of which is coupled with the holes formed on both side faces, and the other end of which is coupled with the spring fixed section 60.

The elastic support of the click holder 18 can generate the click sound continuously by contacting with the gear teeth 66 while the spur gear 26 rotates.

If the user completely rotates the stopper lever 12 in a clockwise or an anti-clockwise direction, the bait casting reel according to the present invention is converted for use by the southpaws (L position) or the dextrals (R position). FIG. 3 illustrates the status in which the click has been moved for use by the dextrals. In operation, if the stopper lever 12 completely rotates in a clockwise direction, the shoulder 74 of the click 50 almost contacts with the protrusions 64 of the cover 6. When the spur fixed section 60 is abutted on the end portion 79 of the guide channel 78 formed on the cover 6, the stopper lever 12 does no longer rotate.

Figure 3:
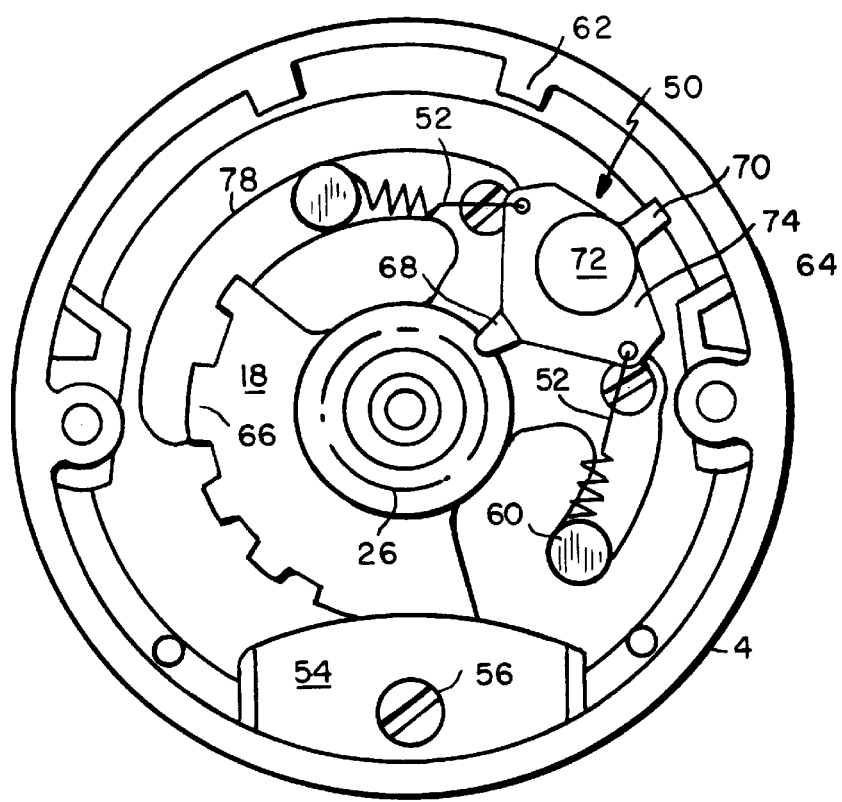
FIG. 3 is a side elevational view illustrating status of the click holder positioned on the right side of the handle.

In a counter-clockwise direction from the perspective of FIG. 3, the spool 4 can still rotate while generating click sound even if the gears 26 push the head 68, because the right shoulder 74 does not contact with the protrusion 64. In a clockwise direction, however, the spool 4 cannot rotate because the right shoulder 74 is abutted on the protrusion 64.

Figure 4:
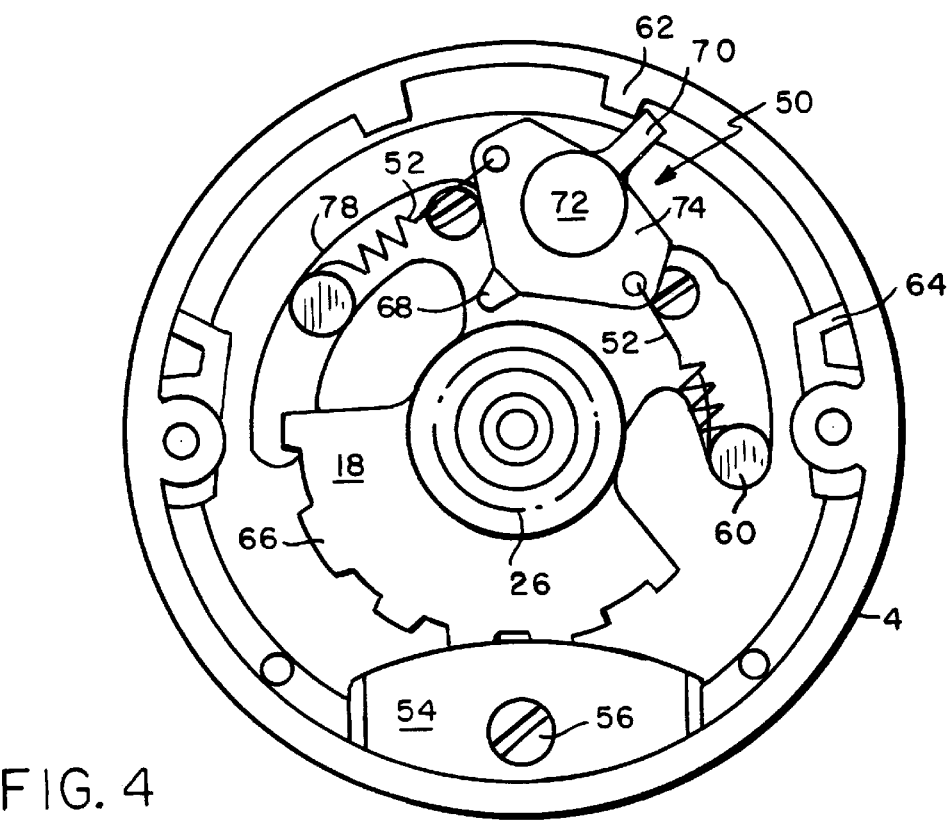
FIG. 4 is a side elevational view illustrating status of the click holder positioned on the left side of the handle.

In order to prevent generation of the click sound when the spool 4 rotates, the stopper lever 12 should be moved to the neutral position as shown in FIG. 4. The gear teeth 66 of the click holder 18 generate click sound once by elastically contacting with the clip spring 22. Subsequently, as illustrated in FIG. 4, the tail 70 of the click pushes the boss 62 of the cover 6 toward one direction so that the head 68 may not face the center of the cover 6. Since the head 68 does not contact with the gear 26 of the spool 4, no click sound is generated when the spool 4 rotates.

As described above, the bait casting reel according to the present invention comprises a lever, in which a click can be easily manipulated from outside. Thus, the user can convert the operating status of the reel in any place to conform to the user convenience.

What is claimed is:

1. A bait casting reel switchable for use by a left-handed person or a right-handed person, comprising:

a frame;

a spool rotatably supported by the frame and having a gear on each of a side of the spool; and at least one cover disposed on either side of the frame and including a click holder and a lever connected to the click holder, the click holder being selectively rotatable by the lever and having a click pivotally mounted to the click holder, and the click including a head portion in frictional contact with the gear of the spool, a pair of shoulder portions to prevent rotation of the click in cooperation with desired portions of the cover, and an apparatus to return the click from a moved position to an original position with one end thereof connected to the click and with the other end thereof connected to the click holder;

wherein the click member allows rotation of the spool in a first direction and prevents rotation of the spool in a second direction when the lever is moved to a left-handed position, and wherein the click member allows rotation of the spool in the second direction and prevents rotation of the spool in the first direction when the lever is moved to a right-handed position.

2. The bait casting reel according to claim 1, wherein the click has a tail portion positioned opposite to a head portion and selectively in connect with any one of bosses formed inside the cover to prevent the head portion of the click from being in contact with the gear.

3. The bait casting reel according to claim 1, wherein the cover has a clip spring, and the click holder has a gear tooth formed on one side thereof and in elastic contact with the clip spring to produce a click sound when the click holder moves.

4. The bait casting reel according to claim 1, wherein the desired portions of the cover include at least two protrusions extended inwardly from an inner peripheral surface of the cover, and wherein one of the shoulder portions is abutted against the protrusion, and the other of the shoulder portion freely rotates, thereby allowing the spool to rotate selectively.

* * * * *